March 6, 1956 W. S. OLIWA 2,737,647

KEYBOARD ALARM

Filed Oct. 25, 1952

INVENTOR
WALTER S. OLIWA
BY William S. Slover
ATTORNEY 2,737,647

KEYBOARD ALARM

Walter S. Oliwa, Summit, N. J., assignor to Monroe Calculating Machine Company, Orange, N. J., a corporation of Delaware Application October 25, 1952, Serial No. 316,850

7 Claims. (Cl. 340—345)

Figure 1:
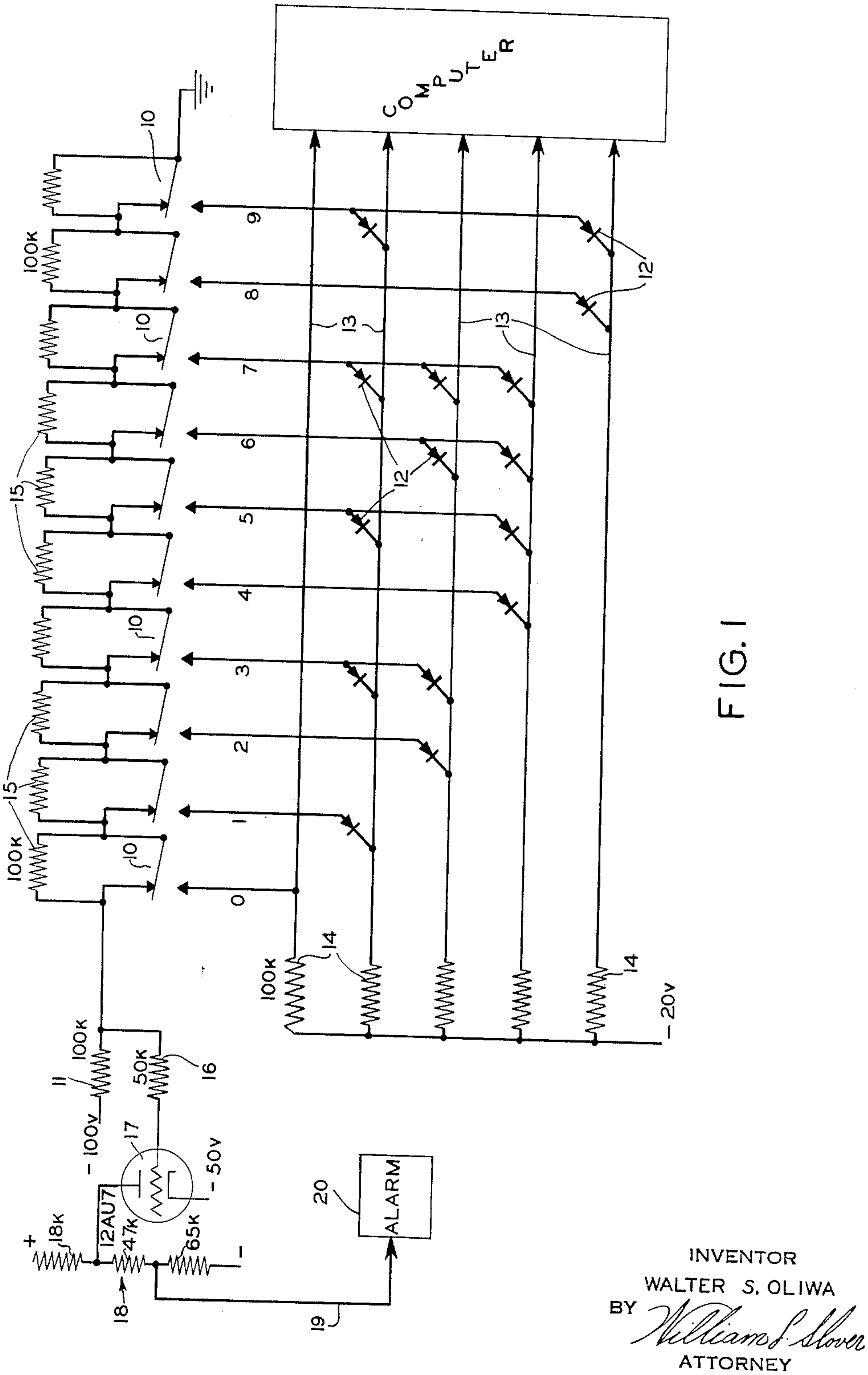

The invention described and claimed herein may be manufactured and used by or for the Government of the United States of America for governmental purposes without the payment of any royalties thereon or therefor.

This invention relates to new and useful improvements in keyboards for electronic computers and the like and more particularly to error detection means for such keyboards.

Where keyboards are utilized for entering data into electronic computers or the like, care must be taken to prohibit the entry of erroneous data which would adversely affect the accuracy of the results of any computation in which such data was a factor. The care which must be exercised in manipulating such keyboards is greatly increased when the keyboard is of the ten key variety wherein there is no check as to which keys, if any, have been manipulated. A common error which arises in the use of ten key keyboards is the concurrent depression of more than a single key which, of course, often leads to the entry into the device controlled by the keyboard of an erroneous digit or other item of information.

The principal object of the invention, therefore, is the provision, in a ten key keyboard for controlling a computer or the like, of means for actuating an alarm whenever two or more keys are operated concurrently.

According to a preferred embodiment of the invention, the keyboard includes a plurality of signal lines normally maintained at a first potential, a series of keys normally completing a path between sources of potential of which one is higher than said first potential, means initiated on operation of each key and breaking of said path, for applying said higher potential to selected ones of said signal lines, electronic tube means connected to said path and maintained in a conductive state when none of the keys are operated, resistors shunting the several keys in said path and adapted to maintain the conductive state of the said tube when only one key is operated but to effect cutoff thereof when more than one key is operated, and an alarm actuated on cutting off of said tube.

Other objects and features of the invention will become apparent from the following description when read in the light of the attached drawing which is a schematic wiring diagram of a preferred embodiment of the invention.

In the illustrated embodiment of the invention the several digit keys of a ten key keyboard are adapted to control the potential levels of five signal lines which are representative of the binary coded decimal values 0, 1, 2, 4 and 8, and thereby to effect entry of digital information into a computer or the like. It is to be understood, however, that the invention is also applicable to keyboards adapted to control computers and the like in accordance with other codes.

Referring to the drawing, the digital keys of the keyboard are in the form of transfer contacts 10 which are connected together through their back contacts in a series path. The said path is connected at one end to a source of ground potential and at the other end to a source of negative potential, say −100 volts, through a resistor 11 which may be of the order of 100,000 ohms. The front contacts of the several keys are connected through diodes 12 with the appropriate ones of five signal lines 13 having the binary coded decimal values of 0, 1, 2, 4 and 8. The differential nature of the connection of the several diodes 12 to the lines 13 is obvious on inspection and need not be described. Each of the signal lines is connected through a resistor 14 which may be of the order of 100,000 ohms with a source of negative potential, say −20 volts. Evidently, the several signal lines are normally maintained at a potential level of −20 volts. Operation of one of the keys or transfer contacts 10, however, applies ground potential to selected ones of the lines 13 through the diodes 12. The several signal lines lead to a computer or the like in the manner described in the copending application of William Burkhart et al., Serial No. 270,876, or in other suitable manner, and when the potential levels thereof are raised to ground potential as just described they effect entry of the appropriate digit into the computer.

In order to provide a warning to the operator of the keyboard that more than one of the keys 10 have been operated concurrently and, therefore, that an erroneous entry into the computer has been made, a resistor 15 which, in the present instance is substantially equal in value to the resistor 11 is connected across each of the keys 10 in such manner as to maintain the series path through the back contacts of the several keys completed even though the key is operated. Also a current limiting resistor 16 is connected between the positive side of resistor 11 and the grid of a triode 17 whose cathode is connected to a source of negative potential, in the present instance −50 volts. The anode of triode 17 is connected to the juncture of the two positivemost sections of a voltage divider 18 having an output line 19 extended from the positive side of the negativemost section thereof, which point is the center tap of the divider. Output line 19 is connected to an alarm 20 which may be a lamp or other visual indicator, and the values of the resistors in voltage divider 18 are chosen to effect the application to line 19 of a voltage sufficient to actuate the alarm only when triode 17 is cut off. Preferably, alarm 20 includes a lock-up relay or like device to maintain the alarm in actuated condition until it is manually reset.

The arrangement is such that when none of the keys 10 are operated a potential of approximately zero volts is applied to the grid of triode 17 and the latter is maintained conducting. Further, when a single key 10 is operated, the voltage drop in the series path between −100 volts and ground is divided evenly between the resistor 11 and the resistor 15 associated with the operated key, and a potential of substantially −50 volts is applied to the grid of the triode. Inasmuch as a −50 voltage is also applied to the cathode of the tube, the same continues to conduct. However, when two of the keys 10 are operated concurrently the 100 voltage drop is apportioned between two resistors 15 and the resistor 11 and a potential of approximately −66 volts is applied to the grid of the triode 17. This, of course, effects cutoff of the tube and through line 19 the alarm 20 is actuated. When more than two keys 10 are operated concurrently an even more negative potential is applied to the grid of tube 17 and the same reacts in the same way as when two keys are operated concurrently.

It is believed evident, therefore, that the invention has provided means to warn the operator of the keyboard whenever two or more keys are depressed concurrently.

It is to be mentioned that the value of the resistors 15 need not be the same as that of resistor 11 but can be varied considerably so long as the tube 17 remains conducting when current flows through one of them but is cut off when current flows through two or more of them.

While there has been above described but a single embodiment of the invention, it is to be understood that many modifications and changes may be made therein without departing from the spirit of the invention and it is not desired, therefore, to limit the scope of the invention except as set forth in the appended claims or as dictated by the prior art.

I claim:

1. In a ten key keyboard, the combination of a pair of potential sources of which one is more negative than the other, a series of resistors connected between said sources in series, switches normally shunting all of said resistors save the one nearest the more negative source, but operable, each to effect current flow through the associated resistor, an electronic tube having a grid connected to the more positive side of said one resistor, an anode and a cathode, means for applying to said cathode a bias potential of such value as to effect cutoff of the tube whenever current flow is effected through two or more of said resistors in addition to said one resistor, and an alarm actuated on cutting off of said tube.

2. In a ten key keyboard, the combination of a pair of potential sources of which one is more negative than the other, a series of switches normally completing a series circuit between said sources, but operable independently to open said circuit, a resistor terminating said circuit at said more negative source, a resistor connected across each switch to provide an alternate path for said circuit when the switch is operated, an electronic tube having a grid connected to the more positive side of the first said resistor, an anode and a cathode, means for applying to said tube a bias potential of such value as to effect cutoff of the tube when alternate paths are concurrently completed through two or more of said resistors, and an alarm actuated on cutting off of said tube.

3. The combination according to claim 2 wherein the resistors connected across the switches are all of substantially the same value.

4. In a keyboard, the combination of a pair of potential sources of which one is more negative than the other, a resistor connected between said sources, a series of other resistors, a series of digit representing keys, means controlled by each said key for connecting a said other resistor in series with the first said resistor between the latter and the more positive source, an electronic tube having an anode, a cathode, and a grid which is connected to the more positive side of the first said resistor, means for applying to said tube a bias of such value as to effect cutoff of the tube when two or more of said other resistors are connected in series with the first said resistor, and an alarm actuated on cutting off of the tube.

5. The combination according to claim 4 wherein said other resistors are all of substantially the same value.

6. In a keyboard, the combination of a pair of potential sources of which one is more negative than the other, a resistor connected between said sources, a series of other resistors, a series of digit representing keys, means controlled by each key for connecting a said other resistor in series with the first said resistor, an alarm, and means sensitive to potential changes at the more positive side of said first resistor for actuating said alarm whenever two or more of said other resistors are connected in series with the first said resistor.

7. In a keyboard, the combination of a pair of potential sources of which one is more negative than the other, a resistor connected between said sources, a series of other resistors, a series of keys, means controlled by each key for connecting a said other resistor in series with the first said resistor, an alarm, and means sensitive to potential changes at the more positive side of said first resistor for actuating said alarm whenever two or more of said other resistors are connected in series with the first said resistor.

References Cited in the file of this patent

UNITED STATES PATENTS

| | | |
|---|---|---|
| 1,972,985 | Gardner | Sept. 11, 1934 |
| 2,153,737 | Spencer | Apr. 11, 1939 |
| 2,609,433 | Goff | Sept. 2, 1952 |